United States Patent [19]
Finch et al.

[11] Patent Number: 5,772,237
[45] Date of Patent: Jun. 30, 1998

[54] SUSPENSION SYSTEM FOR POWERED WHEELCHAIR

[75] Inventors: Thomas E. Finch; James A. Finch, both of Spring Branch, Tex.

[73] Assignee: Teftec Corporation, Spring Branch, Tex.

[21] Appl. No.: 744,204

[22] Filed: Nov. 5, 1996

Related U.S. Application Data

[60] Provisional application No. 60/017,679 May 21, 1996.
[51] Int. Cl.⁶ .................................................. B60G 11/26
[52] U.S. Cl. .................. 280/704; 180/65.1; 180/65.5; 180/907; 280/43; 280/43.17; 280/43.22; 280/43.23
[58] Field of Search ............................... 280/704, 250.1, 280/43, 43.17, 43.18, 43.22, 43.23, 702, 711; 297/DIG. 3, DIG. 4, DIG. 10, 344.12, 344.18; 414/921; 180/907, 65.1, 65.5

[56] References Cited

U.S. PATENT DOCUMENTS 3,578,352  5/1971  Heine ..................................... 280/43.23

FOREIGN PATENT DOCUMENTS 857039  12/1960  United Kingdom ................... 280/702

Primary Examiner—Eric D. Culbreth
Attorney, Agent, or Firm—Cox & Smith Incorporated

[57] ABSTRACT

A suspension system for the ground engaging powered and/or caster wheels of a power wheelchair utilizes three links, two of which are universally pivotally connected between the frame of the wheelchair and a wheel mounting transaxle housing or subframe so that the wheels can tilt relative to the frame of the wheelchair in a vertical plane. A third link is connected between the vehicle frame and the wheel mounting structure which can only pivot in a vertical plane, thus restraining the wheels from any lateral displacement relative to the vehicle frame. Fluid cylinders operable between the links and the vehicle frame provide cushioning of the frame and also, by subtraction of fluid from the fluid cylinders, can lower the entire frame of the wheelchair relative to the ground engaging wheels to permit the wheelchair and occupant to drive into the side door opening of a conventional van.

8 Claims, 5 Drawing Sheets

SUSPENSION SYSTEM FOR POWERED WHEELCHAIR

RELATIONSHIP TO PRIOR INVENTION

This application constitutes a continuation in part of provisional U.S. patent application Ser. No. 60/017,679, filed on May 21, 1996, the disclosure of which is incorporated herein by reference.

FIELD OF THE INVENTION

This invention relates to an improved suspension system for a powered wheelchair or similar self-propelled vehicle wherein the vehicle frame may be conveniently lowered relative to the powered wheels and all wheels of the vehicle are vertically movable relative to the vehicle frame to permit the wheels to follow the contour of the ground or road on which the vehicle is operated.

BACKGROUND OF THE INVENTION

Powered wheelchairs and similar vehicles available on the market are generally characterized by a pair of power driven wheels and one or more caster wheels which are non-adjustably mounted on the vehicle frame. Thus, in the case of the wheelchair, the combined height of the occupant of the wheelchair and the chair structure exceeds the clearance available in conventional side loading passenger vans, thereby requiring that the wheelchair be loaded into the van without the occupant and the occupant then manually lifted into the van and placed in the wheelchair.

The prior solutions to this problem include an expensive modification of the van to lower the van floor so that the occupant can drive the wheelchair directly into the van, with the aid of a small ramp. Another approach is to raise the roof of the van and install a powered lifting platform, which projects through the side door of the van. Such modifications of conventional passenger vans having side loading doors generally involve expenditures on the order of $10,000 over and above the cost of the van.

Another problem encountered with conventional wheelchairs and similar self-propelled vehicles is that the wheel mountings do not permit any of the wheels, whether power driven or caster wheels, to move independently in a vertical plane to follow the ground or road contour on which the vehicle is operated.

Cushioning the frame of the vehicle and the occupant from road shocks is also greatly desired.

It is the object of this invention to overcome the above listed problems that are encountered with conventional suspension systems for power wheelchairs and similar self-propelled vehicles.

SUMMARY OF INVENTION

A powered wheelchair, or similar self-propelled vehicle, embodying this invention preferably employs two powered ground engaging wheels which are rotatably mounted on opposite ends of a transaxle housing which contains a dual planetary transmission. The transaxle housing and the enclosed dual planetary transmission is preferably of the constructions disclosed in issued U.S. Pat. No. 5,275,248 and our pending application Ser. No. 08/652,975, filed May 25, 1996, both of which are incorporated herein by reference.

An elongated frame for the wheelchair is provided which mounts an occupant seat, driving and steering motors, and a battery compartment in conventional fashion. The battery compartment is preferably located beneath the vehicle seat. In accordance with this invention, the transaxle housing is mounted to a first vertically depending frame portion by three links. Two of the links are identical and one end of such links is respectively mounted in a pair of universal pivot mountings, such as a ball joint or elastometric bushing, respectively provided in horizontally spaced relation on the aforementioned depending frame portion. The other ends of such links are respectively mounted to two universal pivot mountings provided on the transaxle housing in horizontally spaced relation. Thus the powered wheels are free to move vertically relative to each other by tilting of the transaxle housing to follow the ground or road contour.

To prevent lateral displacement of the powered wheels relative to the frame, a third link of generally triangular configuration is provided. Such link has horizontal pivots on each end of its triangular base and two horizontally spaced, single axis pivot mountings for said horizontal pivots are provided on the aforementioned first depending frame portion in vertically spaced relation to the universal pivot mountings. The vertex portion of the triangular link, which is hereinafter referred to as the stabilizing link, is pivotally secured to a universal pivot mounting on the transaxle housing at a position centrally intermediate the aforementioned two universal pivot mountings.

Thus the transaxle housing, and hence the powered wheels, is prevented from horizontal displacement relative to the vehicle frame.

Two caster wheels for the vehicle are conventionally mounted on a T-shaped subframe having a horizontal leg that supports the caster wheels and a vertical leg which is mounted to a second depending frame portion that is longitudinally spaced relative to the first depending frame portion. For example, the one depending frame portion may also provide a front wall for the battery compartment, while the other depending frame portion provides a rear wall for the battery compartment.

The mounting of the caster wheel subframe to the second depending frame portion is accomplished by the same arrangement of three links, two of the links having universal pivot connections to the second depending frame portion and the vertical leg of the caster wheel subframe, plus a triangular stabilizing link having two horizontal axis pivot connections to the second depending frame portion and a single universal pivot connection to the caster wheel subframe. Thus the caster wheels have the same mountings as described for the powered wheels and can move independently of each other and the vehicle frame to conform to the ground or road contour.

To selectively position the height of the frame relative to the caster wheels, a pair of hydraulic or pneumatic cylinders are respectively mounted between the stabilizing link and said vehicle frame. The axes of each such cylinders are generally vertical. A motor driven fluid pump is mounted at any convenient location on the vehicle frame. An operator actuated fluid control circuit is provided to selectively effect the elongation or contraction of both the fluid cylinders.

Alternatively, and in the preferred embodiment of the invention, two fluid cylinders can be utilized to respectively connect the two links connecting the transaxle to separate locations provided on the frame. These two cylinders would be substituted for the single cylinder connecting the stabilizing link to the vehicle frame as discussed above. Such two cylinders would be connected in parallel in the fluid control circuit, hence would be concurrently controlled.

Thus the operator can raise, lower or tilt the vehicle frame in a vertical plane relative to the ground engaging powered wheels and caster wheels. The overall height of the vehicle plus the operator can be reduced to permit direct entry into the side loading door of a conventional van by merely providing a ramp from the ground or road to the floor of the van.

The two fluid cylinders can also function to cushion the frame of the vehicle from road shocks, and still permit the wheels of the vehicle, both powered and caster wheels, to move vertically to follow the contour of the ground or road over which the vehicle travels.

The advantages of the aforedescribed suspension system for wheel chairs and similar vehicles will be readily apparent to those skilled in the art.

DETAILED DESCRIPTION OF PREFERRED EMBODIMENTS

Figure 1:
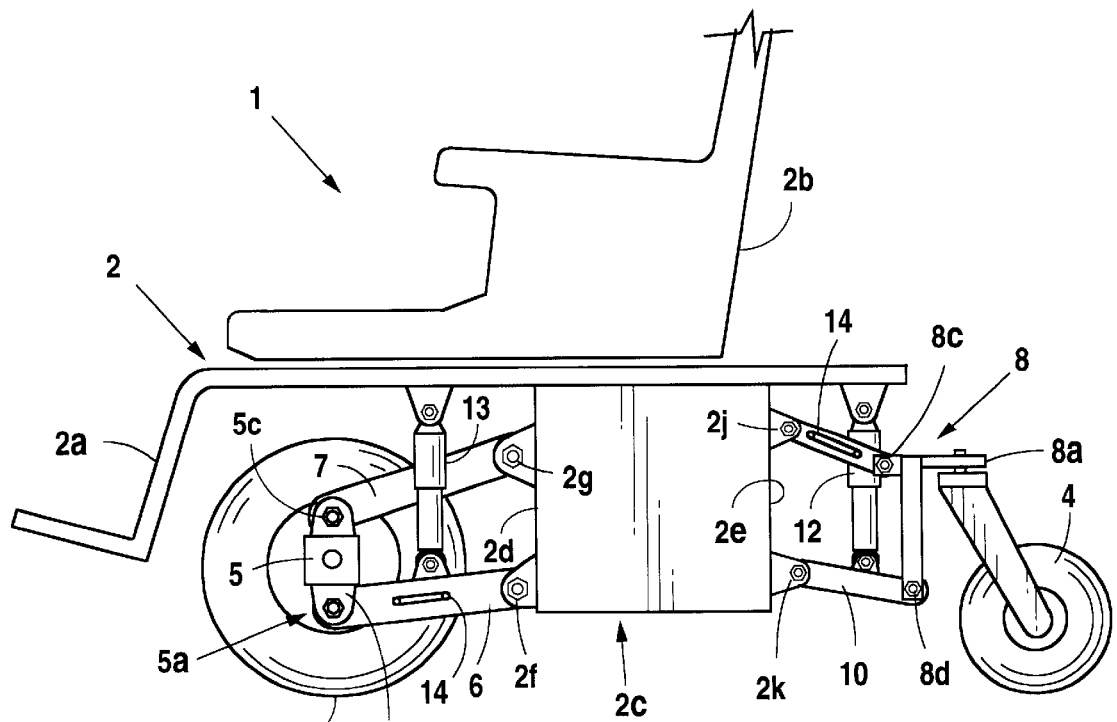
FIG. 1 is a schematic side elevational view of this invention as applied to a powered wheelchair, showing the frame and seat of the wheelchair in their normal elevated position relative to the ground engaging wheels.

Referring to FIG. 1, a powered wheelchair 1 of the type described in detail in U.S. Pat. No. 5,275,248 and our pending application Ser. No. 08/652,975, filed May 24, 1996 is schematically illustrated. Such wheelchair comprises an elongated articulated frame 2, which, at its forward end, defines a leg rest portion 2a while the medial portion of the elongated frame defines a conventional mounting for an occupant seat 2b above the frame 2 and a battery compartment 2c beneath the frame 2 having a forward vertical wall 2d and a rearward vertical wall 2e. The frame 2 is supported and powered by two ground engaging wheels 3 shown at the forward end of the elongated frame 2, and a pair of caster wheels 4 at the rearward end of the frame 2. Those skilled in the art will understand the terms "forward" and "rearward" are relative terms and the positions of the powered wheels 3 and the caster wheels 4 relative to the frame 2 may be reversed.

The two powered wheels are mounted on opposite ends of a transaxle housing 5 which is described in detail in the above referred to issued patent and pending application. For clarity of the drawings, the transaxle housing is deliberately shown in greatly reduced size, but such housing will be understood to contain a dual planetary transmission for applying driving and steering power to the powered wheels 3 as controlled by the occupant, as is fully described in the aforementioned issued patent and pending application. Steering of the wheelchair 1 is accomplished by providing a differential in direction or speed of rotation of the two powered wheels 3.

The mounting of the transaxle housing 5 to the frame 2 thus controls the vertical position of power wheels 3 relative to frame 2, while the mounting of the subframe 8 to the frame 2 controls the vertical position of caster wheels 4 relative to the frame 2.

In accordance with this invention, the mountings for the powered wheels 3 and the caster wheels 4 are functionally identical. A pair of mounting links 6 respectively have their one end connected in horizontally spaced relation to the depending front wall 2d of the battery compartment 2c by universal pivot bearings 2f. The other ends of mounting links 6 are connected by universal pivot bearings 5a provided on the bottom wall of the transaxle housing 5, or any other convenient location which disposes the mounting links in generally parallel relationship. Due to the universal pivot mountings of both ends of the mounting links 6, the powered wheels 3 may assume a plurality of vertical positions relative to the frame 2 as they follow the contour of the ground or road traversed by such wheels.

Figure 3:
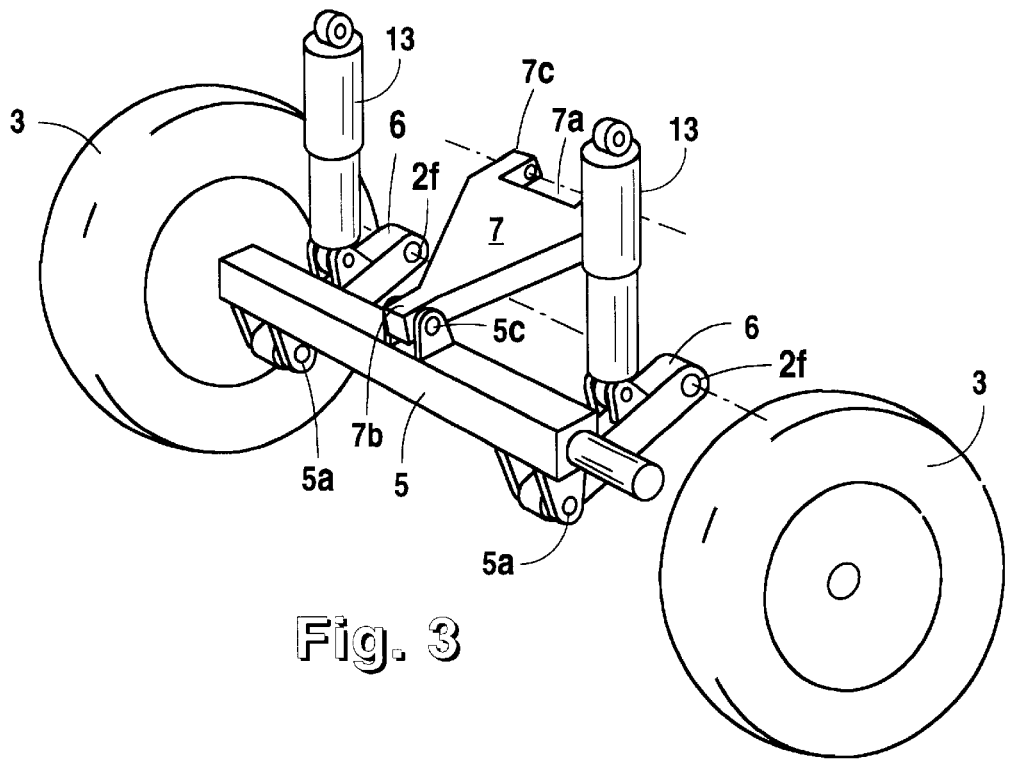
FIG. 3 is a schematic perspective view of a suspension system embodying this invention as applied to the powered wheels of a wheelchair.

To prevent lateral shifting of the transaxle housing 5, hence lateral shifting of the powered wheels 3 relative to frame 2, a stabilizing link 7 is provided which is of a generally triangular or T shaped configuration, having a wide base portion 7a and a vertex portion 7b, as best shown in FIG. 3. A pair of horizontally spaced, horizontal axis pivot mountings 2g are provided on the forward battery compartment vertical wall 2d to respectively receive pivot pins traversing pivot holes 7c provided at the lateral end of stabilizing link 7. Thus stabilizing link 7 can only move in a vertical plane about a horizontal axis defined by the pivot bearings 2g, and can be either above the links 6, as shown in FIG. 3, or below such links.

The vertex end 7b of stabilizing link 7 is secured to the transaxle housing 5 by a universal pivot 5c, thus permitting the transaxle housing 5 to tilt in a vertical plane, due to the powered wheels 3 following ground contours, but there is no significant lateral displacement of the transaxle housing 5 relative to the elongated frame 2.

To similarly mount the caster wheels 4 to the frame 2, a subframe 8 (best shown in FIG. 4) is provided having a generally T-shaped configuration with a horizontal caster wheel mounting leg 8a and a generally vertical link mounting leg 8b. One or preferably two caster wheels 4 are conventionally swivelly mounted on horizontal leg 8a of subframe 8.

To secure the subframe 8 to the elongated frame 2, a pair of mounting links 9 are respectively connected to a pair of universal pivot mountings 8c provided in horizontally spaced relation on the horizontal leg 8a of subframe 8. The other ends of mounting links 9 are respectively connected to a pair of horizontally spaced, universal pivot mountings 2j provided on the rearward vertical wall 2e of the battery compartment 2c. Thus the subframe 8 may freely pivot in a vertical plane as the caster wheels follow the road or ground contours.

Figure 4:
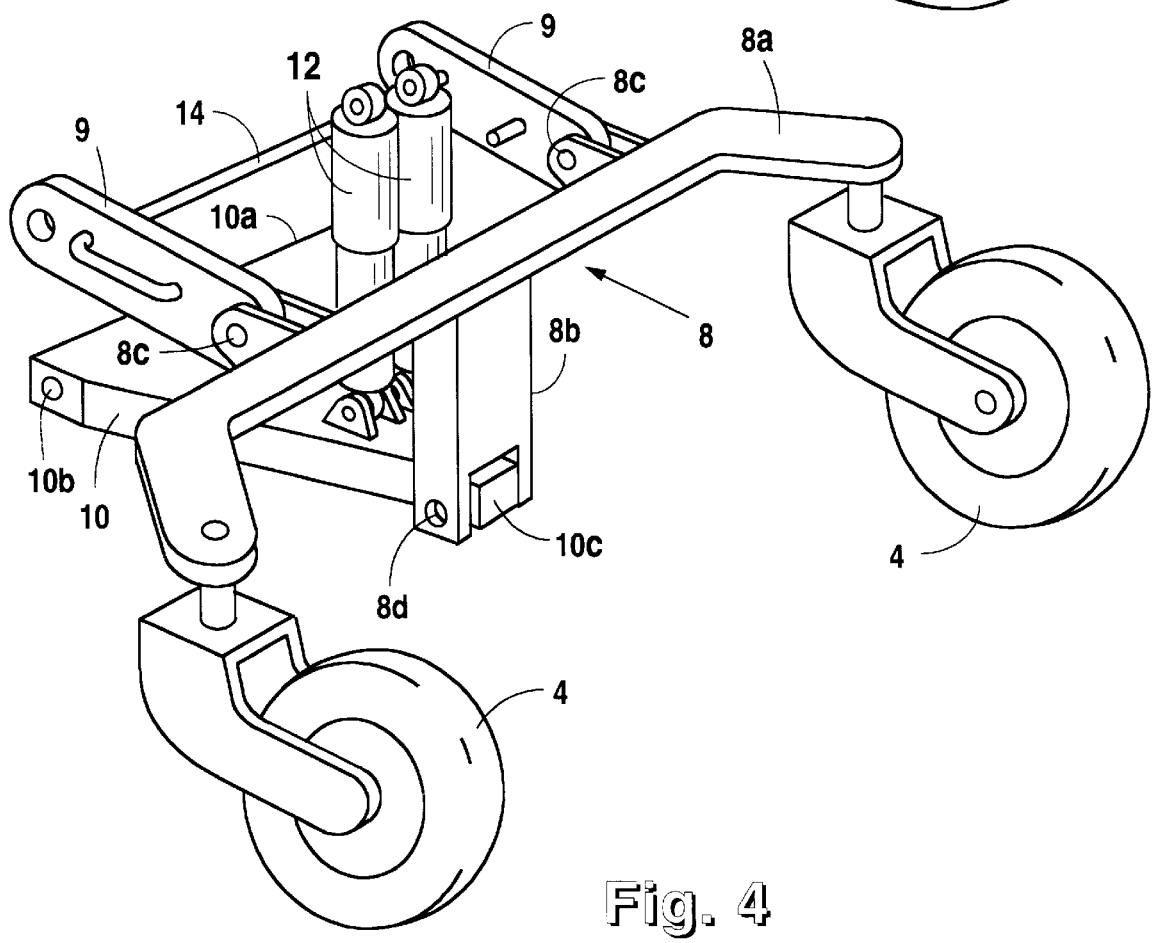
FIG. 4 is an enlarged schematic perspective view of a suspension system embodying this invention as applied to the caster wheels of a wheelchair.

To prevent lateral movement of the subframe 8 relative to the elongated frame 2, a generally triangular or T shaped stabilizing link 10 is provided. Link 10 has a wide base portion 10a terminating in two horizontally spaced single axis pivot bores 10b which are respectively secured to two horizontally spaced, horizontal axis pivot mountings 2k provided on the rearward wall 2e of the battery compartment. The vertex portion 10c of stabilizing link 10 is universally pivotally secured to a pivot bearing 8d on subframe 8. Thus no significant lateral movement of the caster wheels 4 can occur as the wheelchair moves over an uneven surface. Stabilizing link 10 may be either below (as shown in FIG. 4) or above the mounting links 9.

Preferably a torsion rod 14 is connected between mounting links 6 and also between mounting links 9 to maintain the parallelity of the mounting links 6 and 9 relative to each other.

While the aforedescribed mounting structures for the powered and caster wheels of a powered wheelchair will permit such wheels to follow the road or ground contours, such mounting structures also provide for effecting occupant controlled vertical raising and lowering of the frame and seat relative to the wheels. This highly desirable feature is accomplished by providing a pair of fluid pressure cylinders 12 operating between the stabilizing link 10 and the elongated frame 2, as shown in FIG. 4, or by utilizing a pair of fluid pressure cylinders 13 respectively operating between the mounting links 6 and the frame 2, as shown in FIG. 3.

Figure 2:
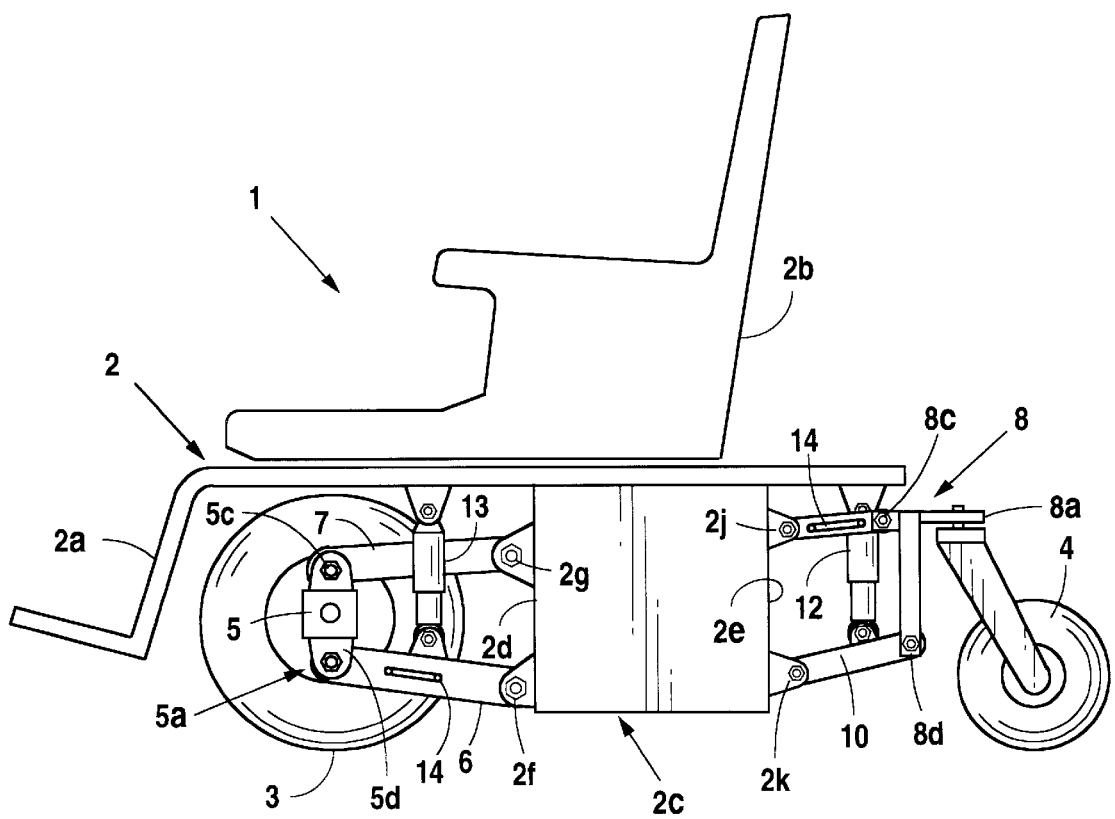
FIG. 2 is a view similar to FIG. 1 but showing the frame and seat of the wheelchair in a lower position relative to the ground engaging wheels.

In either modification, the supply of pressured fluid, either air or hydraulic, to the fluid pressure cylinder will cause such cylinders to expand and elevate the entire frame 2 and the seat occupant relative to the wheels as shown in FIG. 1. Removal of fluid from such cylinders will cause elongated frame 2 to lower relative to the ground engaging wheels 3 and caster wheels 4 to permit the wheelchair with an occupant to enter the side door of a conventional van, as shown in FIG. 2.

Figure 5:
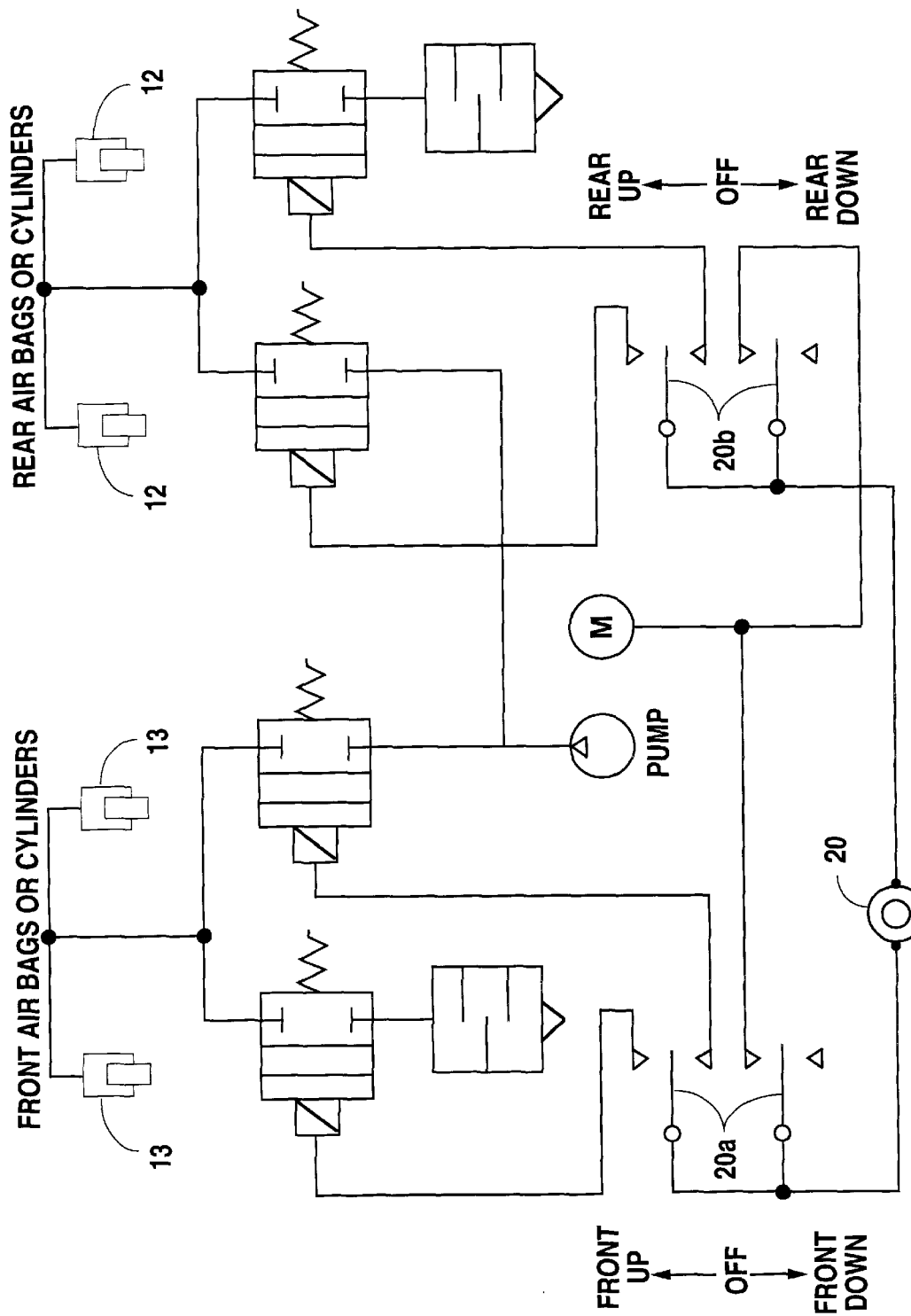
FIG. 5 is a schematic pressured fluid control circuit for effecting changes in elevation of the frame and seat of the wheelchair relative to the ground engaging wheels.

The occupant controlled fluid circuit is fully illustrated in FIG. 5. The applied legends on FIG. 5 make such circuit self-explanatory. It should be particularly noted that separate control of the vertical positions of the powered wheels 3 and the caster wheels 4 relative to frame 2 may be effected by appropriate movement of the control stick 20 which is mechanically connected to switch blades 20a and 20b.

Figure 6:
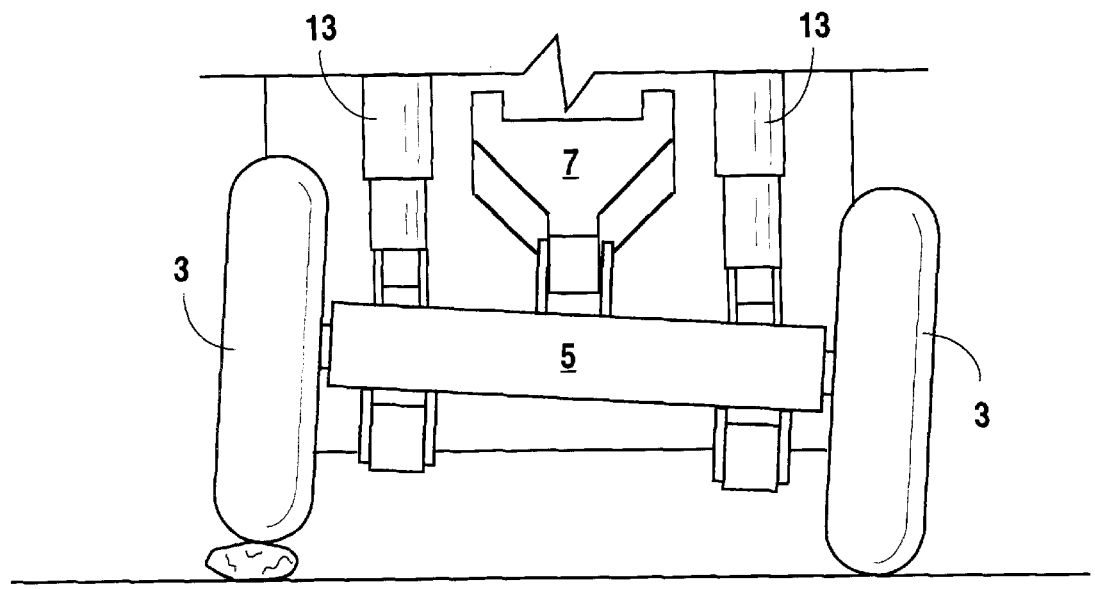
FIG. 6 is a schematic front elevational view of the wheelchair of FIG. 1, illustrating the conformity of the powered wheels to the ground contour.
Figure 7:
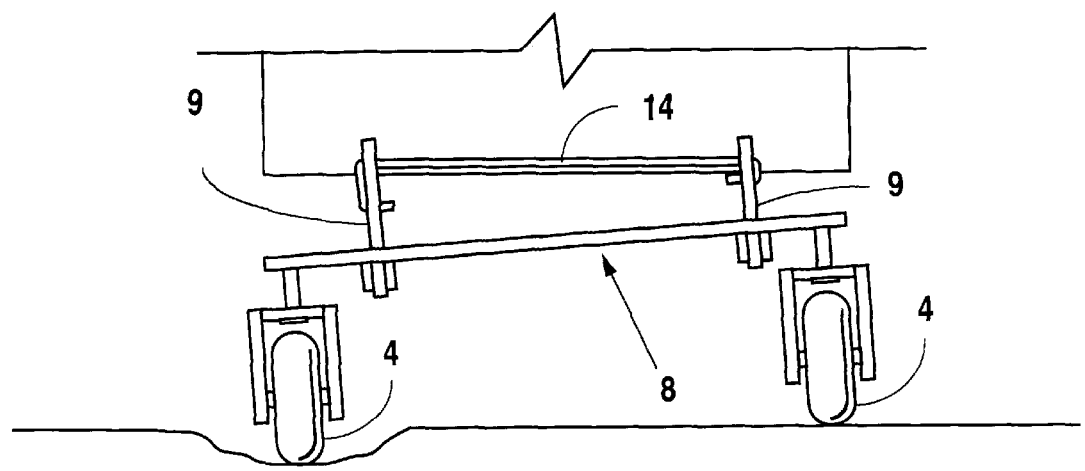
FIG. 7 is a schematic rear elevational view of the wheelchair of FIG. 1, illustrating the conformity of the caster wheels to the ground contour.

The frame elevating and lowering fluid pressure cylinders perform another desirable feature, particularly when such cylinders contain air as the activating fluid. A conventional air bag can be employed. Since the fluid pressure cylinders are respectively connected between the wheel mounting links 6 and 9 and the elongated frame 2, the vertical movements of such links caused by a powered wheel encountering a ridge or depression are cushioned by the fluid pressure cylinders, thus reducing shock forces imparted to the frame, hence to the occupant of the wheelchair. FIG. 6 illustrates the manner in which the powered wheels 3 conform to a ridge in the road or ground surface by tilting of the transaxle housing in a vertical plane. Obviously, the caster wheels 4 will equally conform by the tilting of the subframe 8 in a vertical plane. All of the wheels will also ride through depressions with minimum shock to the occupant, as illustrated in FIG. 7.

Figure 8:
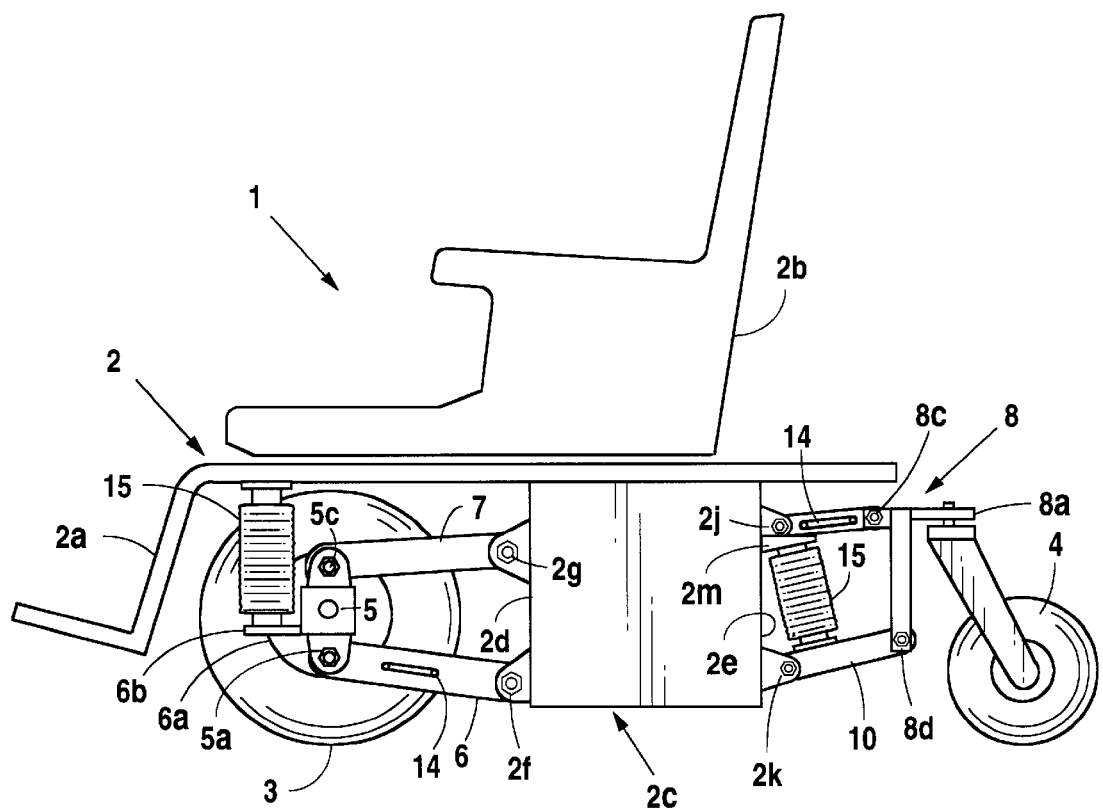
FIG. 8 is a schematic side elevational view of a powered wheelchair incorporating a modification of this invention.

Referring now to FIG. 8 of the drawings, there is shown a modification of this invention which is particularly suited for powered wheelchairs having large transaxle housings 5. Such large transaxle housings would interfere with the location of the fluid cylinders 12 as shown in FIG. 1. Instead, the links 6 are extended forwardly as shown at 6a, and an airbag-type fluid cylinder 15 is mounted between the frame 2 and a ledge 6b formed on the transaxle housing 5.

The functioning of this embodiment is the same as previously described. Pressured air is supplied to, or withdrawn from airbags 15 which function to raise or lower frame 2 relative to the power wheels 3 by pivoting the mounting links 6 and stabilizing link 7. A similar airbag 15 is applied between stabilizing link 10 and a projection 2m on frame 2 to control the vertical position of frame 2 relative to caster wheels 4. Such airbags thus function to reduce rough road shocks transmitted to frame 2, without interfering with the vertical movements of powered wheels 3 or caster wheels 4 to follow the road or ground contours.

Obvious modifications of this invention can be made by those skilled in the art, and it is intended that all such modifications fall within the scope of the appended claims.

Obvious modifications of this invention can be made by those skilled in the art, and it is intended that all such modifications fall within the scope of the appended claims.

We claim:

1. A suspension system for a powered wheelchair having an elongated frame supporting an occupant seat comprising;

a transaxle housing having a pair of power driven wheels mounted on opposite ends of said transaxle housing;

a first linkage means for connecting said transaxle housing in transverse relation to the length of said elongated frame with said transaxle housing being freely tiltable in a vertical plane transverse to said elongated frame;

said first linkage means including universal pivot bearings on said elongated frame and said transaxle housing, whereby said power driven wheels may separately follow the contour of the ground traversed by said power driven wheels;

a fluid pressure cylinder operatively connected between said first linkage means and said frame for vertically positioning said elongated frame relative to said ground engaging power wheels; and operator controlled means for supplying and withdrawing fluid from said fluid pressure cylinder.

2. The suspension system of claim 1 further comprising:

a pair of caster wheels for said powered wheel chair;

a subframe supporting said caster wheels in horizontally spaced relationship;

a second linkage means for supporting said subframe in transverse relationship to the length of said elongated frame and for permitting tilting movement of said subframe in a vertical transverse plane relative to said elongated frame, whereby said caster wheels may follow the contour of the ground traversed by said caster wheels;

a second fluid pressure cylinder operatively connected between said second linkage means and said elongated frame for vertically positioning said elongated frame relative to said caster wheels; and means connecting said second fluid pressure cylinder to said operator controlled means for supplying and withdrawing fluid from said second fluid pressure cylinder.

3. A suspension system for a powered wheelchair having a rigid, elongated frame with longitudinally spaced, depending first and second vertical frame portions, a laterally disposed transaxle housing, a pair of power driven wheels rotatably mounted on opposite lateral ends of said transaxle housing and caster wheel means mounted on said second vertical frame portion for supporting one end of said elongated frame, comprising, in combination:

a pair of horizontally aligned, laterally spaced, universal pivot mountings on said first vertical frame portion;

a pair of identical mounting links respectively having one end universally pivotally mounted in said pair of universal pivot mountings and the other end universally pivotally secured to said transaxle housing, whereby said power driven wheels can move in a vertical plane;

a pair of laterally spaced, horizontally aligned, single axis pivot mountings on said first vertical frame portion vertically spaced relative to said pair of universal pivot mountings and defining a common horizontal axis;

a stabilizing link having a generally triangular configuration defining a wide base portion and a vertex portion;

means on opposite ends of said base portion of said stabilizing link for respectively engaging said pair of single axis pivot mountings to permit pivotal movement of said stabilizing link only in a vertical plane; and means for universally pivotally connecting said vertex portion of said stabilizing link to the lateral center of said transaxle housing; thereby preventing lateral movement of said power wheels relative to said elongated frame without restricting independent vertical movements of said power driven wheels to conform to the ground contour.

4. The suspension system of claim 3 further comprising shock absorbing means operable between said mounting links and said rigid frame.

5. The suspension system of claim 4 wherein said shock absorbing means comprises fluid pressure means for elongating and contracting said shock absorbing means; and operator controlled means for increasing or decreasing the amount of fluid existing in said fluid pressure means to elevate or lower said frame relative to said power driven wheels.

6. The suspension system of claim 3 wherein said caster wheel means comprises a T-shaped subframe having a horizontal leg supporting two caster wheels in horizontally spaced, depending relation and a vertical leg;

a second pair of horizontally aligned, laterally spaced universal pivot mountings on said second vertical frame portion;

a second pair of identical mounting links respectively having one end universally pivotally mounted in said second pair of universal pivot mountings and the other end universally pivotally secured to said horizontal leg of said T-shaped subframe, whereby said caster wheels can move in a vertical plane relative to each other;

a second pair of laterally spaced, horizontally aligned, single axis pivot mountings on said second vertical frame portion, vertically spaced relative to said second pair of universal pivot mountings and defining a common horizontal pivot axis;

a second stabilizing link having a generally triangular configuration defining a wide base portion and a vertex portion;

pivot pins on each end of said wide base portion respectively mounted in said second pair of single axis pivot mountings; and means for universally pivotally connecting said vertex portion of said second stabilizing link to said vertical leg of said T-shaped subframe, thereby preventing horizontal movement of said caster wheels relative to said elongated rigid frame without restricting independent vertical movements of said caster wheels to conform to the ground contour.

7. The suspension system of claim 6 further comprising a first shock absorbing means operable between said first pair of mounting links and said rigid elongated frame; and a second shock absorbing means operable between said second stabilizing link and said rigid elongated frame.

8. The suspension system of claim 7 wherein each said shock absorbing means comprises fluid pressure means for elongating and contracting each said shock absorbing means; and operator controlled means for increasing or decreasing the amount of fluid existing in said fluid pressure means to elevate or lower said rigid elongated frame relative to said power driven wheels and said caster wheels.

* * * * *